(12) United States Patent
Tueno et al.

(10) Patent No.: US 11,250,140 B2
(45) Date of Patent: Feb. 15, 2022

(54) CLOUD-BASED SECURE COMPUTATION OF THE MEDIAN

(71) Applicant: SAP SE, Walldorf (DE)

(72) Inventors: Anselme Kemgne Tueno, Erlenbach (CH); Mubashir Mehmood Qureshi, Sandhausen (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 16/289,415

(22) Filed: Feb. 28, 2019

(65) Prior Publication Data

US 2020/0279045 A1 Sep. 3, 2020

(51) Int. Cl.
| | |
|---|---|
| *G06F 21/60* | (2013.01) |
| *G06F 7/24* | (2006.01) |
| *H04L 9/08* | (2006.01) |
| *H04L 9/30* | (2006.01) |
| *H04L 29/06* | (2006.01) |
| *G06F 7/58* | (2006.01) |

(52) U.S. Cl.
CPC .............. *G06F 21/602* (2013.01); *G06F 7/24* (2013.01); *H04L 9/0841* (2013.01); *H04L 9/0869* (2013.01); *H04L 9/30* (2013.01); *H04L 63/0442* (2013.01); *G06F 7/582* (2013.01); *H04L 2209/46* (2013.01)

(58) Field of Classification Search
CPC ... H04L 9/0841; H04L 63/0442; H04L 9/085; H04L 9/008; H04L 9/0869; H04L 9/30; H04L 2209/46; G06F 21/602; G06F 7/24; G06F 7/582
See application file for complete search history.

(56) References Cited

U.S. PATENT DOCUMENTS

| | | | | |
|---|---|---|---|---|
| 8,010,782 | B2* | 8/2011 | Kerschbaum | G06Q 30/08 |
| | | | | 713/153 |
| 9,077,539 | B2* | 7/2015 | Kamara | H04L 9/3218 |
| 10,565,399 | B2* | 2/2020 | Huang | G06F 21/6254 |
| 10,691,754 | B1* | 6/2020 | El Defrawy | G06F 16/9038 |

(Continued)

FOREIGN PATENT DOCUMENTS

EP 3340067 A1 * 6/2018 ............. G06F 17/18

OTHER PUBLICATIONS

Carter et al., Secure Outsourced Garbled Circuit Evaluation for Mobile Devices, 2013, USENIX, 22nd USENIX Security Symposium, pp. 289-302 (Year: 2013).*

(Continued)

*Primary Examiner* — Chau Le
(74) *Attorney, Agent, or Firm* — Erise IP, P.A.

(57) ABSTRACT

A garbled circuit and two garbled inputs are received by a server from each pair of a plurality of clients. The garbled circuit encodes a comparison function and the garbled inputs encode a respective data value from each of the clients in each pair. Thereafter, the server evaluates the garbled circuits using the corresponding garbled inputs to result in a plurality of comparison bits. The server can then sort the datasets in an ascending or descending order by using the comparison bits to compute the rank of each data value. Using the sorted datasets, the server determines a median value for the datasets and transmits data characterizing the median value to each of the clients.

20 Claims, 3 Drawing Sheets

(56) References Cited

U.S. PATENT DOCUMENTS

| | | | |
|---|---|---|---|
| 10,746,567 B1* | 8/2020 | Bernau | G01D 4/002 |
| 2012/0070000 A1* | 3/2012 | Baechler | H04L 9/3218 |
| | | | 380/255 |
| 2015/0341326 A1* | 11/2015 | Premnath | H04L 63/062 |
| | | | 713/171 |
| 2015/0381349 A1* | 12/2015 | Nikolaenko | G09C 1/00 |
| | | | 713/189 |
| 2016/0004874 A1* | 1/2016 | Ioannidis | G06F 17/16 |
| | | | 713/165 |
| 2016/0119119 A1* | 4/2016 | Calapodescu | G06F 21/6227 |
| | | | 380/30 |
| 2017/0243204 A1* | 8/2017 | Murphy | G06Q 20/3829 |
| 2018/0060485 A1* | 3/2018 | Huang | G16B 30/00 |
| 2018/0337782 A1* | 11/2018 | Wu | H04L 9/14 |
| 2019/0228299 A1* | 7/2019 | Chandran | G06N 3/0481 |
| 2019/0342105 A1* | 11/2019 | Adams | H04L 9/3278 |
| 2020/0213112 A1* | 7/2020 | Singleton, IV | G06F 21/552 |
| 2020/0304293 A1* | 9/2020 | Gama | G06N 3/08 |
| 2021/0157937 A1* | 5/2021 | Van Liesdonk | G06F 21/62 |
| 2021/0359844 A1* | 11/2021 | Sloane | H04L 9/3239 |

OTHER PUBLICATIONS

Voulgaris et al., On the Evaluation of Greek Industrial SMEs' Performance via Multicriteria Analysis of Financial Ratios, 2000, Kluwer Academic Publishers, pp. 127-130 (Year: 2000).*
Aaron Walker, Everything you need to know about Cloud Computing, http://learn.g2.com, pp. 1-15 (Year: 2018).*
Web Application Hosting in the AWS Cloud, Amazon Web Services, pp. 2-15 (Year: 2017).*
Nikolaenko et al., "Privary-Preserving Matrix Factorization", ACM CCS 2013, Retrieved From https://marcjoye.github.io/papers/NIWJTB13sorting.pdf, Published 2013 (Year: 2013).*
G. Aggarwal, N. Mishra, and B. Pinkas. Secure computation of the median (and other elements of specied ranks). J. Cryptology 23(3):373-401 (2010).
G. Aggarwal, N. Mishra, and B. Pinkas. Secure computation of the $k^{th}$-ranked element. In Advances in Cryptology—Eurocrypt 2004, International Conference on the Theory and Applications of Cryptographic Techniques, Interlaken, Switzerland, May 2-6, 2004, Proceedings, pp. 40-55, 2004.
M. Bellare, V. T. Hoang, and P. Rogaway. Foundations of garbled circuits. In Proceedings of the 2012 ACM Conference on Computer and Communications Security, CCS '12, pp. 784-796, New York, NY, USA, 2012. ACM.
M. Ben-Or, S. Goldwasser, and A. Wigderson. Completeness theorems for non-cryptographic fault-tolerant distributed computation. STOC '88, pp. 1-10, New York, NY, USA, 1988. ACM.
D. Chaum, C. Crépeau, and I. Damgard. Multiparty unconditionally secure protocols. STOC '88, pp. 11-19, New York, NY, USA, 1988. ACM.

I. Damgåaard and M. Jurik. "A Generalisation, a Simplification and some Applications of Paillier's Probabilistic Public-Key System," BRIGS, RS-00-45; pp. 1-18, Dec. 2000.
Ejgenberg et al., "SCAPI: The Secure Computation Application Programming Interface," 17 pages (2013).
Fischlin, M.: A Cost-Effective Pay-Per-Multiplication Comparison Method for Millionaires. In: Naccache, D. (ed.) CT-RSA 2001. LNCS, vol. 2020, pp. 457-472. Springer, Heidelberg (2001).
C. Gentry. Fully homomorphic encryption using ideal lattices. STOC '09, pp. 169-178, New York, NY, USA, 2009. ACM.
O. Goldreich, S. Micali, and A. Wigderson. How to play any mental game. STOC '87, pp. 218-229, New York, NY, USA, 1987. ACM.
Katz, J., Yung, M.: Threshold cryptosystems based on factoring. In: Zheng, Y. (ed.) ASIACRYPT 2002. LNCS, vol. 2501, pp. 192-205. Springer, Heidelberg (2002).
F. Kerschbaum. Adapting privacy-preserving computation to the service provider model. In Proceedings of the 12th IEEE International Conference on Computational Science and Engineering, CSE 2009, Vancouver, BC, Canada, Aug. 29-31, 2009, pp. 34-41, 2009.
F. Kerschbaum. Practical privacy-preserving benchmarking in Proceedings of the IFIP TC-11 23rd International Information Security Conference, IFIP 20th World Computer Congress, IFIP SEC 2008, Sep. 7-10, 2008, Milano, Italy, pp. 17-31, 2008.
Lindell and Pinkas, "A Proof of Security of Yao's Protocol for Two-Party Computation," pp. 1-25, Jun. 26, 2006.
Lindell and Pinkas, "Secure Multiparty Computation for Privacy-Preserving Data Mining," May 6, 2008 (39 pages). Obtained from the Internet on Mar. 4, 2019: <URL: http://citeseerx.ist.psu.edu/viewdoc/download?doi=10.1.1.215.6337&rep=rep1&type=pdf>.
Naor, M., Pinkas, B., and Sumner, R., "Privacy preserving auctions and mechanism design," in Proceedings of the 1st ACM conference on Electronic commerce. ACM, 1999, pp. 129-139.
Paillier, "Public-Key Cryptosystems Based on Composite Degree Residuosity Classes," J. Stern (ed.): EUROCRYPT'99, LNCS 1592, pp. 223-238 (1999).
B. Pinkas, T. Schneider, N. Smart, and S. Williams. Secure two-party computation is practical. In ASIACRYPT 2009, vol. 5912 of LNCS, pp. 250-267. Springer, Dec. 2009.
A. C. Yao. Protocols for secure computations. In Proceedings of the $23^{rd}$ Annual Symposium on Foundations of Computer Science, SFCS '82, pp. 160-164, Washington, DC, USA, 1982. IEEE Computer Society.
A. C. Yao. How to generate and exchange secrets (extended abstract). In 27th Annual Symposium on Foundations of Computer Science, Toronto, Canada, Oct. 27-29, 1986, pp. 162-167. IEEE Computer Society, 1986.
Becher et al., "An Enhanced Approach to Cloud-based Privacy-preserving Benchmarking (Long Version)," arxiv.org, pp. 1-12 (2018).
Feigenbaum et al., "Secure Computation of Surveys," SMP 2004, pp. 1-6 (2004).

* cited by examiner

CLOUD-BASED SECURE COMPUTATION OF THE MEDIAN

TECHNICAL FIELD

The subject matter described herein relates to securely computing the median of the union of private datasets.

BACKGROUND

Benchmarking is a management process where a company compares its Key Performance Indicators (KPI) to the statistics of the same KPIs of a group of competitors, named peer group. A KPI is a statistical quantity which measures the performance of a business process. Examples of KPI from different company operations are make cycle time (manufacturing), cash flow (financial) and employee fluctuation rate (human resources). A peer group is a group of (usually competing) companies that are interested in comparing their KPIs based on some similarity of the companies. Examples formed along different characteristics include car manufacturers (industry sector), Fortune 500 companies in the United States (revenue and location), or airline vs. railway vs. haulage (sales market). A big challenge for benchmarking is that the KPIs are very sensitive and highly confidential, even within one company.

Privacy is one of the biggest concerns in benchmarking. Companies are hesitant to share their business performance data due to the risk of losing a competitive advantage or being embarrassed. There exist privacy-preserving protocols, that can be used for benchmarking that keep the KPIs confidential within one company. However, they all require a communication link between any pair of parties, resulting in high communication overhead when the number of parties becomes very large.

SUMMARY

In a first, aspect, a garbled circuit and two garbled inputs are received by a server from each pair of a plurality of clients. The garbled circuit encodes a comparison function and the garbled inputs characterize the respective data value from each of the clients in the pair. Thereafter, the server evaluates the garbled circuits using the garbled inputs to result in a plurality of comparison bits. The server can then sort the datasets in an ascending or descending order by using the comparison bits to compute the rank of each data value. Using the sorted datasets, the server determines a median value for the datasets and transmits data characterizing the median value to each of the clients.

A common seed can be shared among each pair of a plurality of clients prior to transmitting their respective garbled circuits. The common seed can be shared amongst the clients using a key exchange protocol. The common seed can be a shared symmetric key used to seed a pseudorandom number generator that is used to generate the respective garbled inputs. The key exchange protocol can be a Diffie-Hellmann key exchange protocol.

If a size of the datasets is odd, the median value is a middle value in the sorted datasets. If a size of the datasets is even, the median value is a mean of two middle values in the sorted datasets.

The server can receive a respective public key from each client and later transmit such public keys to each client. The server can compute an encrypted data characterizing the median value using the respective public keys of each of the clients such that the data transmitted to each of the clients is encrypted for each such respective client.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for the computation of a median for diverse private data sets while, at the same time, preserving the confidentiality of the underlying data.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
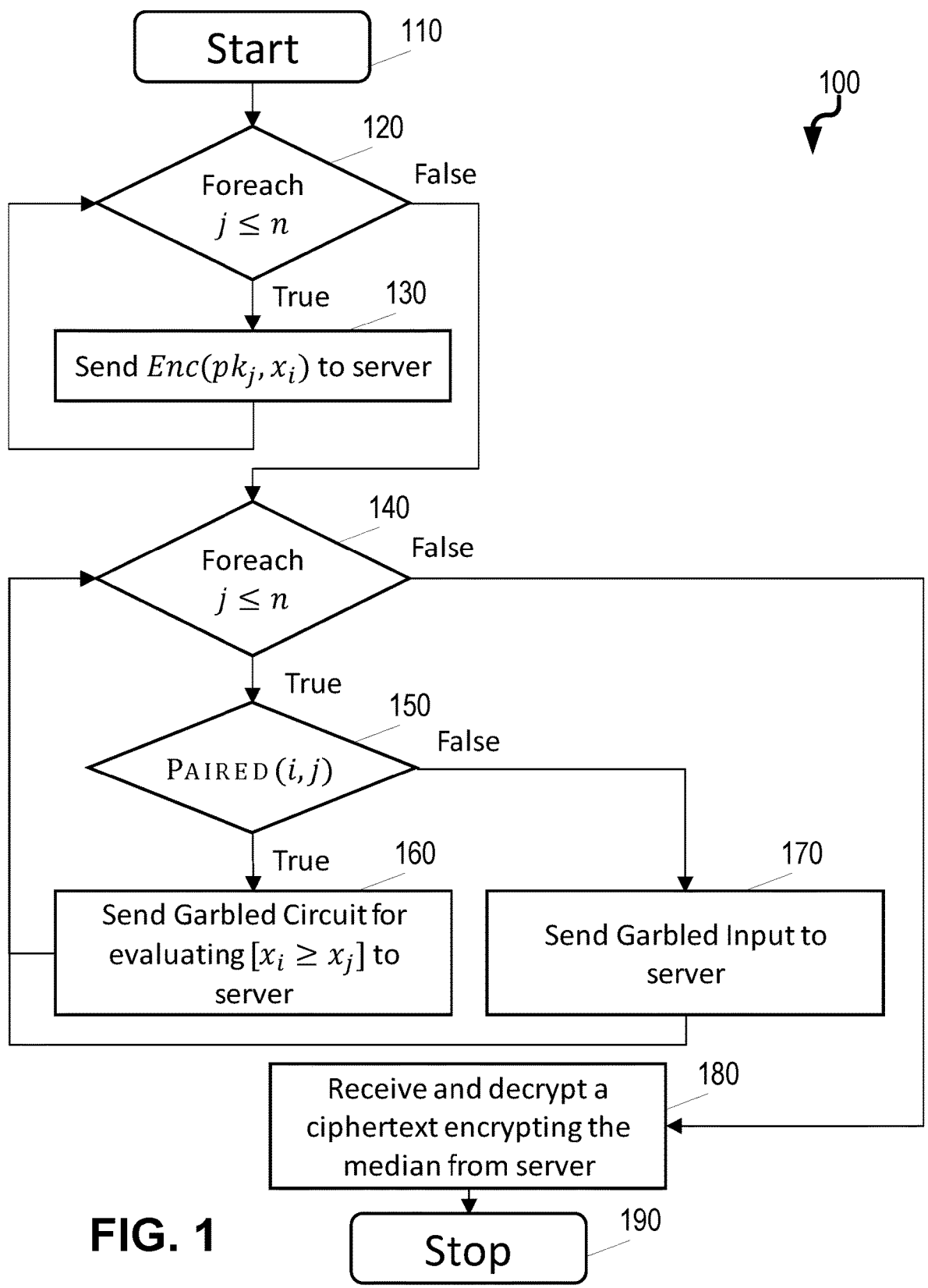
FIG. 1 is a process flow diagram illustrating the secure computation of a median of datasets from a client perspective.

The current subject matter is directed to securely computing the median of the union of many private datasets. This is a special case of the problem of computing the k-th ranked element. It is an instance of secure multiparty computation protocol where several parties wish to compute a public known function on their private input while revealing only the output of the computation to a designated subset of parties and nothing else. The computation of the k-th ranked element is of particular interest in settings such as collaborative benchmarking where the individual datasets may contain proprietary information, yet where the k-th ranked element is of mutual interest to the participating companies.

A service provider as described herein can be characterized as an organization which offers server-based services to its customers. It may control several servers running the service or parts of it, by acting as software as a service (SaaS) provider. During the multi-party computation of the median computation protocols, the service provider is a regular participant without any input, and it is therefore not allowed to learn plaintext KPIs from the participants. This means the service provider remains oblivious in the computation process. As in a star network, the clients can only communicate with the service provider, but never amongst each other directly. It is also beneficial to keep anonymity among the participants, which can only be guaranteed, if they do not need to address messages to each other directly. The explicit requirement for anonymity is that a subscriber does not know (or refer to) any static identifier of other subscribers (e.g. IP addresses, public keys, etc.). Any static identifier can disclose the composition of the peer group to the subscribers, and it may break the privacy of the complete system.

With the current subject matter, two protocols can be used for securely computing the median using an oblivious central server; namely a garbled circuit (GC) approach and a threshold homomorphic encryption approach.

With the garbled circuit (GC) approach, a garbled circuit is a two-party protocol in which one party acts as an evaluator, and the other party plays the role of a generator. In the secure median protocol as provided herein, the server evaluates all GCs. In an initial step each pair of parties uses Diffie-Hellmann key exchange protocol to share a common seed. In the online protocol, both parties use their common seed to generate and send one garbled circuit and the corresponding garbled inputs to the server.

With the threshold homomorphic encryption approach, parties share a private key of an homomorphic encryption scheme. The parties can use the common public key to send their encrypted input to the server. The server runs computation on encrypted input and the parties jointly decrypt the result. The computation at the server can combine Goldwasser-Micali encryption with Fischlin's comparison protocol.

Secure multiparty computation (SMC) allows n parties $P_1, \ldots, P_n$, with private input $x_1, \ldots, x_n$ to compute a known function $y=f(x_1, \ldots, x_n)$ such that only y is revealed and nothing else. Security in SMC is defined by comparison to an ideal model in which a trusted third party (TTP) receives $x_1, \ldots, x_n$ computes and outputs $y=f(x_1, \ldots, x_n)$. In a real model, parties emulate the ideal model by executing a cryptographic protocol. A SMC protocol is then said to be secure if the adversary can learn only the result y and nothing else. Example security models can include semi-honest and malicious models. Semi-honest adversaries follow the protocol but try to learn more information, while malicious adversaries may deviate from the protocol specification.

GC can be used to execute a function over symmetrically encrypted inputs. With a GC protocol, let $f$ be a function over two inputs x and y such that a garbling scheme comprises a five-tuple of algorithms G=(Gb, En, De, Ev, ev). The original function $f$ is encoded as circuit that the function $ev(f,\bullet,\bullet):\{0,1\}^n \times \{0,1\}^n \to \{0,1\}^m$ can evaluate. On input $f$ and security parameter $k \in \mathbb{N}$, algorithm Gb returns a triple of strings $(F,e,d) \leftarrow Gb(1^k, f)$. The string F describes a garbled function, $Ev(F,\bullet,\bullet)$, that maps each pair of garbled inputs (X,Y) to a garbled output Z=Ev(F,X,Y). The string e describes an encoding function, En(e, •), that maps initial inputs $x,y \in \{0,1\}^n$ to garbled inputs X=En(e,x), Y=En(e,y). The String d describes a decoding function, De(d,•), that maps a garbled output Z to a final output z=De(d,Z). The garbling scheme is correct if De(d,Ev(F,En(e,x), En(e,y)))=ev(f,x,y).

The current GC protocol is a 2-party protocol comprising a generator (Gen) and an evaluator (Eva) with input x and y respectively. On input $f$ and k, Gen runs $(F,e,d) \leftarrow Gb(1^k, f)$ and parses e as $(X_1^0, X_1^1, \ldots, X_n^0, X_n^1, Y_1^0, Y_1^1, \ldots, Y_n^0, Y_n^1)$. Then Gen sends F, d and $X=(X_1^{x_1}, \ldots, X_n^{x_n}) \leftarrow En(e,X)$ to Eva, where $x_i$ represents the i-th bit of x. Now the parties execute an oblivious transfer protocol with Eva having selection string y and Gen having inputs $(Y_1^0, Y_1^1, \ldots, Y_n^0, Y_n^1)$. As a result, Eva obtains $Y=(Y_1^{y_1}, \ldots, Y_n^{y_n})$ and Gen learns nothing. Finally, Eva evaluates and outputs z=De(d,Ev(F,X,Y)).

Let Enc(m) denotes the probabilistic encryption of a plaintext m. Then additive homomorphic encryption (HE) can have the following property:

$$Enc(m_1)Enc(m_2)=Enc(m_1+m_2)$$

By multiplying two ciphertexts, a ciphertext of the sum can be obtained. With the current protocol, a public-key scheme of Paillier can be used.

Threshold Homomorphic Encryption (THE) allows for sharing a private key to the parties such that a subset of parties is required for decryption. Formally, let ID= $\{\ldots, id_i, \ldots\}$ be the set of identities of the n clients ($1 \leq i \leq n$). A THE scheme consists of the following algorithms:

PK, $\mathbb{SK} \leftarrow KeyGen(\lambda, t, \mathbb{ID})$: The probabilistic key generation algorithm takes a security parameter $\lambda$ and generates a public key PK, the corresponding private key SK. It also generates n shares $\mathbb{SK}=\{SK_1, \ldots, SK_n\}$ of the private key SK, such that t shares can be used to recover SK.

$c \leftarrow Enc(PK, m)$: The probabilistic encryption algorithm encrypts a message m using the public key PK producing a ciphertext c.

$m'_i \leftarrow Dec(SK_i, c)$: The partial decryption algorithm decrypts a ciphertext c using a share $SK_i \in \mathbb{SK}$ of the private key producing a share $m'_i$ of the message m'.

$m' \leftarrow Rec(\mathbb{M}_t)$: The reconstruction algorithm takes a subset $$\mathbb{M}_t=\{m'_{i_1}, \ldots, m'_{i_t}\} \subseteq \{m'_1, \ldots, m'_n\}$$

of partial decryption shares and outputs a message m'. We have a correctness condition:

$$m=Rec(Dec(SK_{i_1}, Enc(PK,m)), \ldots, Dec(SK_{i_t}, Enc(PK,m)))$$

and a security condition of IND-CPA security. Furthermore we have a homomorphic property:

$$Enc(PK, m_1) \cdot Enc(PK, m_2) = Enc(PK, m_1+m_2)$$

When used in a protocol, combiner can be used to denote the party responsible to execute the reconstruction algorithm. Depending on the protocol, the combiner can be any protocol participant or a server. It receives a set $M_t=\{m_{j_1}, \ldots, m_{j_t}\}$ of ciphertexts, runs $M \leftarrow Rec(M_t)$ and publishes the result or moves to the next step of the protocol specification.

Diffie-Hellman (DH) key exchange as provided herein is a two-party protocol for securely exchanging cryptographic keys over a public channel. With this protocol and as an example, assume the parties are called Alice and Bob, and they can exchange a common key as follows:

Alice generates the description of a cyclic group $\mathbb{G}$ and a generator g, and sends the result to Bob. Let m denote the number of element in $\mathbb{G}$.

Alice chooses a random index $x \in \{1, \ldots, m-1\}$ and computes $h_1 = g^x$. Alice sends $h_1$ to Bob Bob chooses a random index $y \in \{1, \ldots, m-1\}$ and computes $h_2 = g^y$. Bob sends $h_2$ to Alice. (Note that this can be computed and sent before Bob receives $h_1$ from Alice.)

Alice outputs $k = h_2^x = (g^y)^x = g^{xy}$

Bob outputs $k = h_1^y = (g^x)^y = g^{xy}$

The security of the protocol can rely on the intractability of the discrete log problem which prevents Bob (resp. Alice) to learn x (resp. y) from $h_1$ (resp. h2). In the following, when referring to the DH protocol, the following notations are used: $sk_a = x, pk_{ab} = h_1, sk_b = y, pk_{ba} = h_2, ck_{ab} = ck_{ba} = k$. Hence $sk_a = x, pk_{ab} = h_1, sk_b = y, pk_{ba} = h_2, ck_{ab} = ck_{ba} = k$. Hence, from $sk_a$ and $pk_{ba}$ Alice can compute $ck_{ab} = pk_{ba}^{sk_a}$ and Bob can compute $ck_{ba} = pk_{ab}^{sk_b}$.

Mean, median, and mode are measures of central tendency. These measures provide an overall indication of how a population looks like. The median value refers to the division of the data set into two halves. To compute the median of any dataset, the dataset values are sorted in ascending order. Then there are two possibilities depending on the size of the dataset, either it can be even or odd. When the size of the dataset is odd, the median is exactly the middle value of the sorted dataset. Otherwise, the median is calculated by computing the mean of the two middle values.

Formally, let $x_1, x_2, \ldots, x_n$ be the n data values. To determine the median, the data values are sorted in ascending order. If n is odd, then the median is the value that lies exactly in the middle of the sorted dataset. That is, the median m is the data value at the position $$\frac{n+1}{2}$$

of the ordered list:

$$m = x_{\frac{n+1}{2}}$$

In the even case, the median is the mean of the two middle values of the ordered list. That is, m is the mean of the data values in positions $$\frac{n}{2} \text{ and } \frac{n}{2} + 1$$

of the ordered list:

$$m = \frac{x_{\frac{n}{2}} + x_{\frac{n}{2}+1}}{2}.$$

The distinction between the even and odd cases can be avoided by the setting the middle as $$\lceil \frac{n}{2} \rceil.$$

The median is a fundamental business operation in the collaborative benchmarking. It facilitates to compute the mutual interest of peers. In the context of the current subject matter, the median can be calculated for n (n≥2) confidential datasets in the service provider model. This computation can be important for many different scenarios. For example, several companies may wish to compute the median salary of their employees without revealing to each other their individual salaries. In an another example, a number of different hospitals may be interested in determining the median life expectancy of their patients affected by a particular disease without revealing to each other their private information. In the airline industry, competitive airlines may want to determine the median maintenance cost of their aircraft parts, where the individual number of aircraft parts and maintenance cost are private.

A computation model can be implemented using two mutually distrustful servers. The clients can submit their inputs to one server only using a special proxy Oblivious Transfer protocol. The overall protocol can, for example, used a GC protocol in which one server creates and encrypts the circuit and the other server evaluates the circuit. Multiple servers lead to different business models for the service provider of a privacy-preserving service. The service provider can share benefits with an almost equal peer offering its computational power. In the one server model the service provider can offer the service by himself. In practice, it can be very difficult to verify that two servers are really organizationally separated, although arrangement can be provided such that special service providers are dedicated for privacy-preserving services as described herein.

In a server-aided privacy-preserving protocol as provided herein, the server can be a regular participant without any input. While privacy protects the confidentiality of the KPIs for the companies, it alleviates the server from the burden of storing and handling them and protects it from potential embarrassment due to accidental revelation. Another important aspect of the service provider model is that the subscribed companies only communicate with the service provider, but never amongst each other. Anonymity among the subscribed companies is a beneficial feature and can only be achieved, if they do not need to address messages to each other. The precise requirement for anonymity is that subscribers do not know or refer to any static identifier of other customers (e.g., IP addresses, public keys, etc.).

The protocol runs between n clients and one server. The clients can communicate only through the server which has no input and must remain oblivious, i.e. the server should not learn clients' inputs. The scheme consists of two main steps. In the initialization, parties generate and exchange necessary cryptographic keys through the server. The main protocol allows the clients with the help of the server to run a sorting protocol. This then allows to compute the rank of each element and later the median. After the protocol the parties should learn only the expected result and nothing else. The protocol is secure in the semi-honest model, hence it can be assumed that the parties follow the protocol specification, but may try to learn more information than allowed.

A GC-based secure median protocol (SM-GC) is provided herein. A garbled circuit protocol is a two-party protocol in which one party acts as an evaluator, and the other party plays the role of a generator. However, with the current subject matter, the server acts as an evaluator for all GCs, while for each GC, one party acts as a generator, and the second party just garbles its input. In the traditional GC protocol, the evaluator party gets its garbled input from the generator using an oblivious transfer (OT) protocol. In contrast, with the current subject matter, each party garbles its own input to avoid direct interaction between the parties during the execution of the protocol. Using the DH key exchange protocol, each pair of parties generates a shared symmetric key with the help of the server. This shared symmetric key can be used on both sides to seed a pseudo-random number generator that is used for circuit garbling.

The mandatory initialization can be executed only once and can include a public key distribution and pairwise symmetric key agreement.

Each client can generate a public and private key pair for the Paillier encryption scheme and send the public key to the server. Once the server has received all public keys from the client, the server can distribute them to all clients as illustrated in Steps 1 and 2 of Protocol 1 as provided below.

The Paillier scheme can be used for its additive homomorphic property. Other schemes with similar properties to that of Paillier can also be used (e.g. Benaloh, Damgård -Jurik, ECC ElGamal).

Each pair (i,j) of clients can run the DH key exchange protocol through the server to generate a common secret key $ck_{ij}$. A client $C_i$ can generate a secret key $sk_{ij}$, then compute and send $pk_{ij}$ to the server for all other clients $C_j$. The server can redistribute all the $pk_{ij}$ accordingly which can allow client $C_i$ to compute $ck_{ij}$ as illustrated in Steps 3, 4 and 5 of Protocol 1.

---
Protocol 1 Initialization
---

1: $C_i \to S : PK_i, 1 \leq i \leq n$
2: $S \to C_i : PK_j, 1 \leq i, j \leq n \ (i \neq j)$
3: $C_i \to S : pk_{ij}, 1 \leq i, j \leq n \ (i \neq j)$
4: $S \to C : pk_{ji}, 1 \leq i, j \leq n \ (i \neq j)$
5: $C_i : ck_{ij} = pk_{ji}^{ak_i}, 1 \leq i, j \leq n \ (i \neq j)$

---

The shared symmetric key $ck_{ij}$ can be used by clients $C_i$ and $C_j$ to seed a pseudorandom number generator that is used to garble a circuit for comparing $x_i$ and $x_j$. Therefore, both clients can garble their own input. However, with the current subject matter, only one client in each admissible pair (i,j) can send the garbled circuit.

Protocol 3, as provided below, is a one-round protocol in which the clients send their encrypted input and pairwise garbled circuits for input comparison to the server. The server can evaluate the garble circuits, sorts the inputs and compute the median.

Using the public keys of all other clients received in the initialization protocol, each client encrypts its input under Paillier scheme and sends all the resulting ciphertexts to the server. This is illustrated in Step 1 to 2 of Protocol 3. As noted above, Paillier scheme can be used because of its additive homomorphic property.

The pairwise key agreement can enable two clients to generate a common symmetric key. Let i,j be the indices of parties $C_i$ and $C_j$, then the parties can agree on a common secret key $ck_{ij}=ck_{ji}$. In the SM-GC protocol, pairwise common symmetric key can be used as a seed by the pairs to initialize a pseudorandom number generator, in order to garble a similar circuit. Note that pairwise circuits garbling process can only be carried out by the clients. Garbled circuit is by default a two party protocol in which one of party acts as a generator, and the other party plays the role of evaluator. However, with the current subject matter, there is a desired to avoid clients having a direct connection to each other so each client sends the garbled circuit to the server for evaluation. Algorithm 2 provided below can be used to pair parties and set the role of each party in a pair. When garbling, the GC algorithms defined herein can be instantiated with the parameter of the scheme. The function $f$ to garble is the comparison function $f_\geq$. The garbling algorithm Gb takes an additional parameter $ck_{ij}$ and returns $GC^{(i,j)}$, $e^{(i,j)}$, where $GC^{(i,j)}=(F^{(i,j)}, d^{(i,j)})$.

---
Algorithm 2 PAIRED Predicate
---

1: function PAIRED(i , j)
2: return (i ≡ 1 ( mod 2)/\j < i /\ j ≡ 1 ( mod 2)\/
    i ≡ 1 (mod 2) /\ j > i /\ j ≡ 0 (mod 2)\/
    i ≡ 0 (mod 2) /\ j < i /\ j ≡ 0 (mod 2)\/
    i ≡ 0 (mod 2) /\ j > i /\ j ≡ 1 (mod 2))

---

If a pair (i,j) satisfies the PAIRED predicate (Algorithm 2), then client $C_i$ computes $GC^{(i,j)}=Gb(1^k, f_\geq ck_{ij})$, $GI_i^{(i,j)}=En(e^{(i,j)}, x_i)$ and client $C_j$ computes only $GI_j^{(i,j)}=En(e^{(i,j)}, x_j)$. Client $C_i$ sends $M_i^{(i,j)}=(GC^{(i,j)}, GI_i^{(i,j)})$ to the server and client $C_j$ sends $M_j^{(i,j)}=GI_j^{(i,j)}$ (steps 3 to 6 of Protocol 3).

The server can receive all garbled circuits and the garbled inputs from the clients as described above and evaluates the circuits to learn the corresponding comparison results (step 7 to 10 of Protocol 3). The comparison results can be used by the server to compute the rank of each element as illustrated in Step 11 to 12 of Protocol 3.

Given the rank of all elements, the server computes the median. This computation is illustrated in Protocol 3, steps 13 to 17. If n, the number of clients, is odd, then the server selects the ciphertexts $a_{j,i}$ sent in Step 1 by a party $C_j$ such that the rank of that party is $$r_j = \frac{n+1}{2}.$$

If n is even then the server selects the ciphertexts $a_{j_1,i}$, $a_{j_2,i}$ sent in Step 1 by two parties $C_{j_1}$ and $C_{j_2}$ such that the ranks of those parties are $$r_{j_1} = \frac{n}{2} \text{ and } r_{j_2} = \frac{n}{2} + 1.$$

Then the server multiplies $a_{j_1,i} \cdot a_{j_2,i}$ which results in the ciphertext of the sum of the corresponding plaintexts. Finally, the computed ciphertexts $a_{j,i}$ or $a_{j_1,i} \cdot a_{j_2,i}$ are just redistributed to the clients such that they are able to decrypt. In the even case, the parties divide the decrypted result by 2.

---
Protocol 3 GC-Based Median Protocol
---

1:  for i, j :=1 to n do
2:      $C_i \to S: a_{i,j} \gets Enc(PK_j, x_i)$
3:  for i, j := 1 to n do
4:      if PAIRED (i, j) then
5:          $C_i \to S: M_i^{(i,j)} = (GC^{(i,j)}, GI_i^{(i,j)})$
6:          $C_j \to S: M_j^{(i,j)} = GI_j^{(i,j)}$
7:  for i, j := 1 to n do
8:      if PAIRED (i, j) then
9:          S: let $b_{ij} \gets Ev(GC^{(i,j)}, GI_i^{(i,j)}, GI_j^{(i,j)})$
10:         S: let $b_{ji} \gets 1 \ldots b_{ij}$
11: for i := 1 to n do
12:     S : let $r_i \gets \Sigma_{j=1}^n b_{i,j}$
13: for i := 1 to n do
14:     if n mod 2 = 1 then -continued Protocol 3 GC-Based Median Protocol 15: $\quad S \to C_i: m_i \leftarrow a_{j,i} \mid r_j = \dfrac{n+1}{2}$ 16: else 17: $\quad S \to C_i: m_i \leftarrow a_{j_1,i} \cdot a_{j_2,i} \mid r_{j_1} = \dfrac{n}{2}, r_{j_2} = \dfrac{n}{2} + 1$ As noted above, an alternative approach is to use threshold homomorphic encryption based secure median protocol (SM-GM). Threshold homomorphic encryption (THE) as used herein allows the parties to share a private key such that a subset of parties is required for decryption.

The initialization requires a trusted dealer which is not allowed to participate in the main protocol. This step is also called the dealing phase in which the trusted dealer generates a public/private key pair (PK, SK) for an additively homomorphic encryption. Then the private key SK is split in n pieces $SK_1, \ldots, SK_n$ such that at least t pieces are required to reconstruct SK. Finally, the trusted dealer distributes the n pieces $SK_1, \ldots, SK_n$ to the n parties (party $C_i$ receiving $SK_i$) and deletes any local memory referring to SK, $SK_1, \ldots, SK_n$. However, a secure protocol can be run between the clients that allows them to choose a secret $SK_i$ and to jointly compute a common PK such that at least t parties a required for the decryption. The dealing phase depends on the underlying homomorphic encryption. Additionally, each party $C_i$ can generate its own public/private key pair ($pk_i$, $sk_i$) and can distribute $pk_i$ similar to the GC case above.

Protocol 5 provided below is a four-round protocol in which the clients send their inputs encrypted using Goldwasser-Micali encryption under the common public key PK to the server. The server can homomorphically evaluate a comparison function on the inputs and let the clients decrypt the results. The comparison results can then be used to compute the rank of each client's input in the overall dataset.

Goldwasser-Micali (GM) Encryption is a semantically secure public key encryption based on the quadratic residuosity assumption. The public key consists of an RSA-modulus N=pq of two equally large prime numbers p and q and a quadratic non-residue $z \in \mathbb{Z}_N^*$. Given a bit message b, the encryption algorithm chooses a random $r \in \mathbb{Z}_N^*$ and returns $Enc(b) = z^b r^2 \bmod N$, which is a quadratic non-residue if and only if b=1. The scheme has the following properties:

Exclusive-or (xor): $Enc(b) \cdot Enc(b') = Enc(b \oplus b') \bmod N$.
Bit negation (not): $Enc(b) \cdot z = Enc(b \oplus 1) \bmod N$.
Re-randomization: $Rand(Enc(b)) = Enc(b) \cdot Enc(0) \bmod N$.

Another important property is that GM scheme can be turned into an AND-homomorphic $\hat{Enc}$ scheme over $\{0,1\}$. Let $\lambda$ be a sufficiently large integer such that $2^{-\lambda}$ is small enough. Then the AND-GM encryption of 0 is $\hat{Enc}(0) = (Enc(a_1), \ldots, Enc(a_\lambda))$, where $a_1, \ldots, a_\lambda$ are random bits; and the AND-GM encryption of 1 is $\hat{Enc}(1) = (Enc(0), \ldots, Enc(0))$ (i.e., $\lambda$ encryptions of 0). The decryption algorithm takes a sequence of $\lambda$ elements from $\mathbb{Z}_N^*$ and returns 1 if they are all quadratic residues (i.e., encryption of 0), and 0 otherwise (i.e., some elements are quadratic non-residue). Given $\hat{Enc}(b)$ and $\hat{Enc}(b')$, their component-wise product mod N results in $\hat{Enc}(b \wedge b')$ except with error $2^{-\lambda}$. In practice, setting $\lambda$ to be 40 or 50 should be sufficient. A ciphertext $Enc(b)$ of the basic GM encryption can be extended to the AND-GM encryption $\hat{Enc}(b)$. This is denoted by $\hat{Enc}(b) = Ext(Enc(b))$ and can be computed by generating a sequence of $\lambda$ basic encryptions where the i-th elements is randomly chosen between $Rand(Enc(b) \cdot z)$ and $Enc(0)$.

With the comparison protocol, let $\mu$ be the input bit length and let x and y be two numbers with binary representations $x = x_1 \ldots, x_\mu$ and $y = y_1 \ldots y_\mu$. Then x is greater than y if there exist an $i \in \{1, \ldots, \mu\}$ such that $x_i = 1$, $y_i = 0$ and $x_j = y_j$ for all $i < j \leq \mu$. More formally:

$$[x > y] \iff \bigvee_{i=1}^{\mu} \left( x_i \wedge \neg y_i \wedge \bigvee_{j=i+1}^{\mu} (x_j = y_j) \right).$$

One can compute each term $x_i \wedge \neg y_i \wedge \bigwedge_{j=i+1}^{\mu}(x_j = y_j)$ separately, given the ciphertexts of the bits $x_i, y_i$. This is done as follows: compute $(x_j = y_j) := \neg(x_j \oplus y_j)$ and $\neg y_i$ using the basic GM-encryption, extend the results to the AND-homomorphic representation using Ext(), evaluate the resulting AND-homomorphic representations as described.

Finally, the resulting $\mu$ encryptions can be permuted and returned to the owner of the private key. Then [x>y] if and only if there exists a random AND-GM encryption of 1 at a random position. Otherwise we have a sequence of random AND-DM encryptions of 0. The homomorphic comparison is denoted by $Cmp_h(c_i, c_j)$ and is used in step 4 of Protocol 5.

Using the common public key PK generated in the initialization step, each client can encrypts its input under an additive HE scheme and send all the resulting ciphertexts to the server. This is illustrated in step 2 of Protocol 5. Because the comparison protocol operates at binary level, the inputs have to be encrypted bitwise. Hence, if the input bit length is $\mu$, then each ciphertext consists of $\mu$ encryptions of the corresponding bits.

After receiving all ciphertexts, the server computes the comparison $g_{i,j}$ for each pair $(x_i, x_j)$, $1 \leq i,j \leq n$, and chooses t+1 permutations $\pi, \pi_1, \ldots, \pi_t$ of $\{1, \ldots, n\}$ that are used to hide the indexes of $g_{i,j}$ to the clients during the threshold decryption. The server then distributes the threshold decryption task as equally as possible among the clients. For each client $C_i$ the server computes $l_j = \pi(i-j+1 \bmod n)$, $1 \leq j \leq t$, and builds a t×n matrix $M^{(i)}$ as follows:

$$M_1^{(i)} = (g_{l_1, \pi_1(1)}, \ldots, g_{l_1, \pi_1(n)}), \ldots, M_t^{(i)} = (g_{l_t, \pi_t(1)}, \ldots, g_{l_t, \pi_t(n)}).$$

This computation is illustrated in Algorithm 4. The resulting t×n matrix $M^{(i)}$ is then sent to client $C_i$ in step 7 of Protocol 5.

Algorithm 4 TH Goldwasser-Micali Decryption Request

1: function THDECREQ($[g_{i,j}]1 \leq i, j \leq n, i, \pi, \pi_1, \ldots, \pi_t$)
2:    Let $M^{(i)}$ be a t × n matrix
3:    for u := i − t + 1 to i do
4:       $\alpha \leftarrow \pi(u \bmod n)$
5:       $I^{(i)} \leftarrow I^{(i)} \cup \{\alpha\}$
6:       for v := 1 to n do
7:          $\beta \leftarrow \pi_{i+1-u}(v)$
8:          $M_{\alpha,v}^{(i)} \leftarrow g_{\alpha,\beta}$
9:    return $(M^{(i)}, I^{(i)})$ After receiving $M^{(i)}$, each party $C_i$ can perform its local decryption for each ciphertext, re-encrypts each line l ($l \in I^{(i)}$) with the public key $pk_l$ of party $C_l$. This prevents the server to be able to reconstruct the comparison results. Then $C_i$ sends the result $h_{l,v}^{(i)} = Enc(pk_l, (Dec(SK_i, (g_l, v))))$, ($1 \leq v \leq n$) to the server (step 9). Party $C_l$ will be the combiner of the ciphertexts in line 1. Then, in step 11, the server can forward the ciphertexts $h_{l,v}^{(i)}$ to the combiner party $C_l$, which can decrypt, reconstruct the result and compute a rank $r_i = \sum_{j=1}^{n} s_{l,j}$ as illustrated in step 14. Let $a =^? b$ be an operator that returns 1 if a is equal b and 0 otherwise. Party $C_l$ finally sends $$b_l = \left( rl \stackrel{?}{=} \left\lceil \frac{n}{2} \right\rceil \right)$$

to the server in step 15. This arrangement prevents the server to learn the order of the inputs.

Let l' be the unique value such that $$r'_l = \left\lceil \frac{n}{2} \right\rceil$$

and therefore $b_l'=1$. The server computes $i=\pi^{-1}(l')$, selects $\tilde{c}=c_i$ as the ciphertext of the median in step 16 and sends it for decryption to a random set $\mathbb{I}_t$ of t parties in step 19. Each party in $\mathbb{I}_t$ runs its partial decryption and returns a partial result to the server in step 21. Finally, the server recovers the result in step 22 and reveals it to the clients in step 24.

Protocol 5 THE-based Median Protocol

1:    for i := 1 to n do
2:       $C_i \to S$: $c_i \leftarrow \text{Enc}(PK, x_i)$
3:    for i, j := 1 to n do
4:       S: let $g_{i,j} \leftarrow \text{Cmp}_h(c_i, c_j)$
5:    S: let $\pi, \pi_1, \ldots, \pi_i$ be random permutations of $\{1, \ldots, n\}$
6:    for i := 1 to n do
7:       $S \to C_i$: $(M^{(i)}, I^{(i)}) \leftarrow T_M G_M D_{EC} R_{EQ}([g_{ij}], i, \pi, \pi_1, \ldots, \pi_i)$
8:    for i, j := 1 to n do
9:       $C_i \to S$: $h_{l,j}^{(i)} \leftarrow \text{Enc}(pk_l, (\text{Dec}(SK_i, (M_{l,j}^{(i)})))), l \in I^i$
10:    for l, j := 1 to n do
11:       $S \to C_l$: $h_{l,j}^{(ii)}, \ldots, h_{l,j}^{(ii)}$
12:    for l := 1 to n do
13:       for j := 1 to n do
14:          $C_l$: $s_{l,j} \leftarrow \text{Rec}(\text{Dec}(sk_l, h_{l,j}^{(ii)}), \ldots, \text{Dec}(sk_l, h_{l,j}^{(ii)}))$
15:    $C_l \to S$: $b_l \leftarrow \left( \sum_{j=1}^{n} s_{l,j} \stackrel{?}{=} \left\lceil \frac{n}{2} \right\rceil \right)$
16:    S: let l' | $b_{l'} = 1$; $i \leftarrow \pi^{-1}(l')$; $\bar{c} \leftarrow c_i$
17:    S: let $I_t \leftarrow \{1, \ldots, n\}$ be a set of t random indexes
18:    for all $i \in I_t$ do
19:       $S \to C_i$: $\bar{c}$
20:    for all $i \in I_t$ do
21:       $C_i \to S$: $si \leftarrow \text{Dec}(SK_i, \bar{c})$
22:    S: let $m \leftarrow \text{Rec}(s_1, \ldots, s_t)$
23:    for i: = 1 to n do
24:       $S \to C_i$: m FIG. 1 is a process flow diagram 100 illustrating the secure computation of a median of datasets from a client perspective. Client in this regard refers to a computing device that can access and interact with a server (e.g., a cloud server, etc.) via one or more computing networks (e.g., the Internet, etc.). The process starts at 110 in which, at 120, a determination is made as to whether j is less than or equal to n. j in this regard refers to a particular client and n in this regard refers to total number of clients. If this condition has been met, then at 130, the client sends an encrypted version of its dataset for evaluation ($\text{Enc}(pk_j, x_j)$) to the server. This loop is repeated until such time that a determination is made, at 120, that j is greater than n. At such time, another iterative loop is initiated, at 140, that again determines whether j is less than or equal to n. When such condition is met, at 150, a pairing determination (Algorithm 2) is made with i and j. Such pairing is checked for each pair of clients $C_i$ and $C_j$. If the pairing is true, then at 160, a garbled circuit is sent to the server for evaluating $[x_i \leq x_j]$. If the pairing is false, then at 170, a garbled input is sent to the server. This iterative loop is continued until such time that a determination is made, at 140, that j is greater than n. Subsequently, at 180, the client can receive a ciphertext encapsulating the median of the datasets which can be decrypted. The process can, at 190, then terminate.

Figure 2:
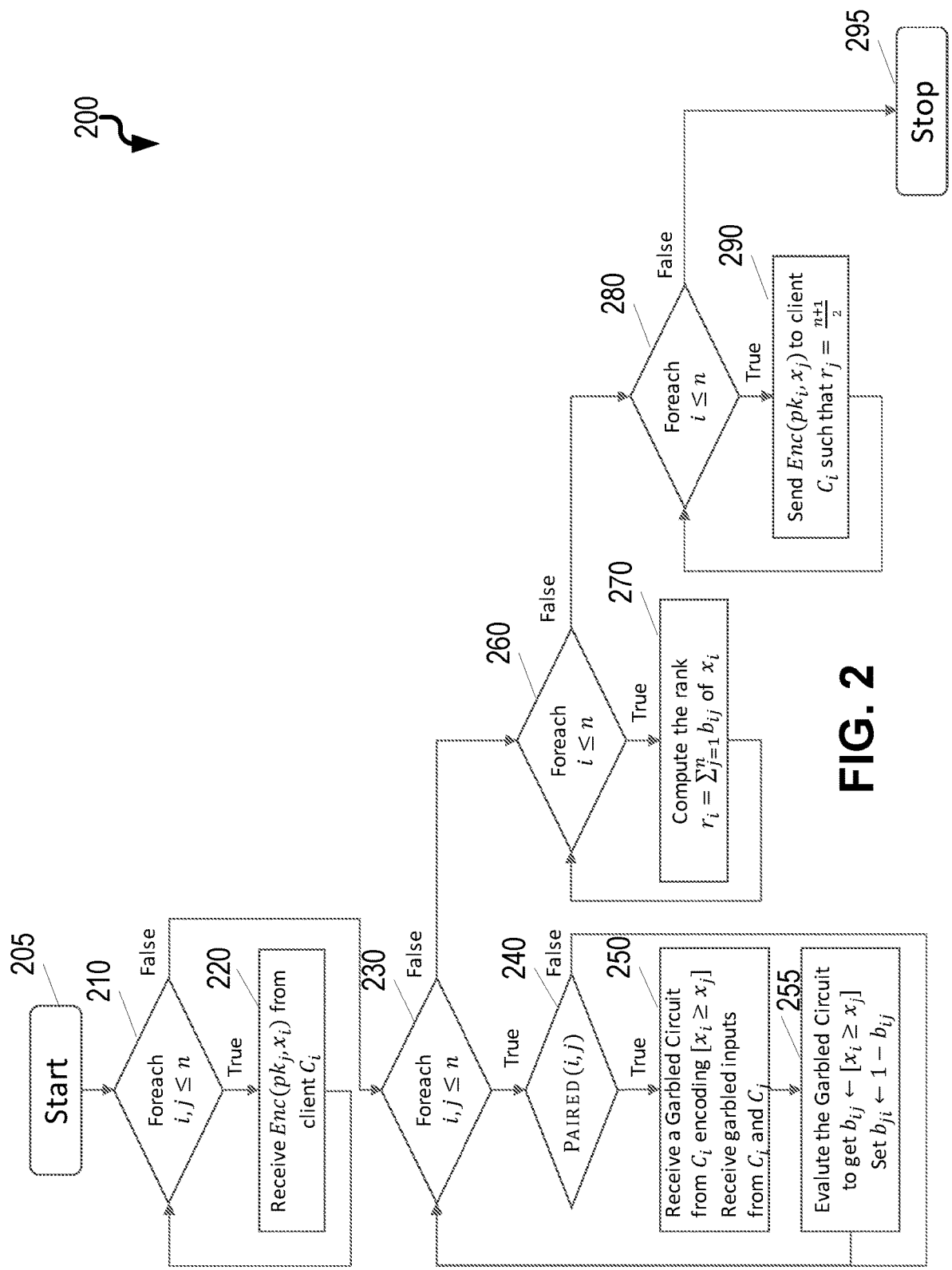
FIG. 2 is a process flow diagram illustrating the secure computation of a median of datasets from a server perspective.

FIG. 2 is a process flow diagram 200 illustrating the secure computation of a median of datasets from a server perspective. Server in this regard refers to a computing device such as a cloud-based server that interacts with a plurality of clients via one or more computing networks (e.g., the Internet, etc.). The process starts at 205 in which, at 210, a determination is made as to whether the counters i,j are less than or equal to n. i, j in this regard refers to the indexes of the pairs of clients $C_i$ and $C_j$, and n in this regard refers to the total number of clients. If this condition has been met, then at 220, the server receives the encrypted version of the respective dataset ($\text{Enc}(pk_j, x_i)$) from a client (e.g., client $C_i$ encrypts $x_i$ client with the public key of all other clients. This process is repeated until such time that a determination is made, at 210, that the counters i,j are greater than n. At such time, another iterative loop is initiated, at 230, that again determines whether i, j are less than or equal to n. When such condition is met, at 240, a pairing determination (Algorithm 2) is made with i, j. Such pairing is checked for each pair of clients $C_i$ and $C_j$. If the pairing is true, the server evaluates (at 255) a garbled circuit received from a client $C_i$ with garbled inputs received (at 250) from clients $C_i$ and $C_j$ to get $b_{ij} \leftarrow [x_i \geq x_j]$. The server then sets $b_{ji} \leftarrow 1 - b_{ij}$. This iterative loop, at 230, is continued until such time that a determination is made that i and j are greater than n. Then, at 260, an iterative loop is initiated that terminates when i is less than or equal to n. As part of this loop, at 270, the server calculates the rank $r_i = \sum_{j=1}^{n} b_{ij}$ of $x_i$. This iterative loop, at 260, is continued until such time that a determination is made that i is greater than n. A still further iterative loop is initiated at 280 that terminates when i is less than or equal to n. As part of this loop, at 290, the server sends $\text{Enc}(pk_i, x_j)$ to client $C_i$ such that $r_j = (n+1)/2$. The process, at 295, can then terminate as the computed median has been provided to the various clients.

Figure 3:
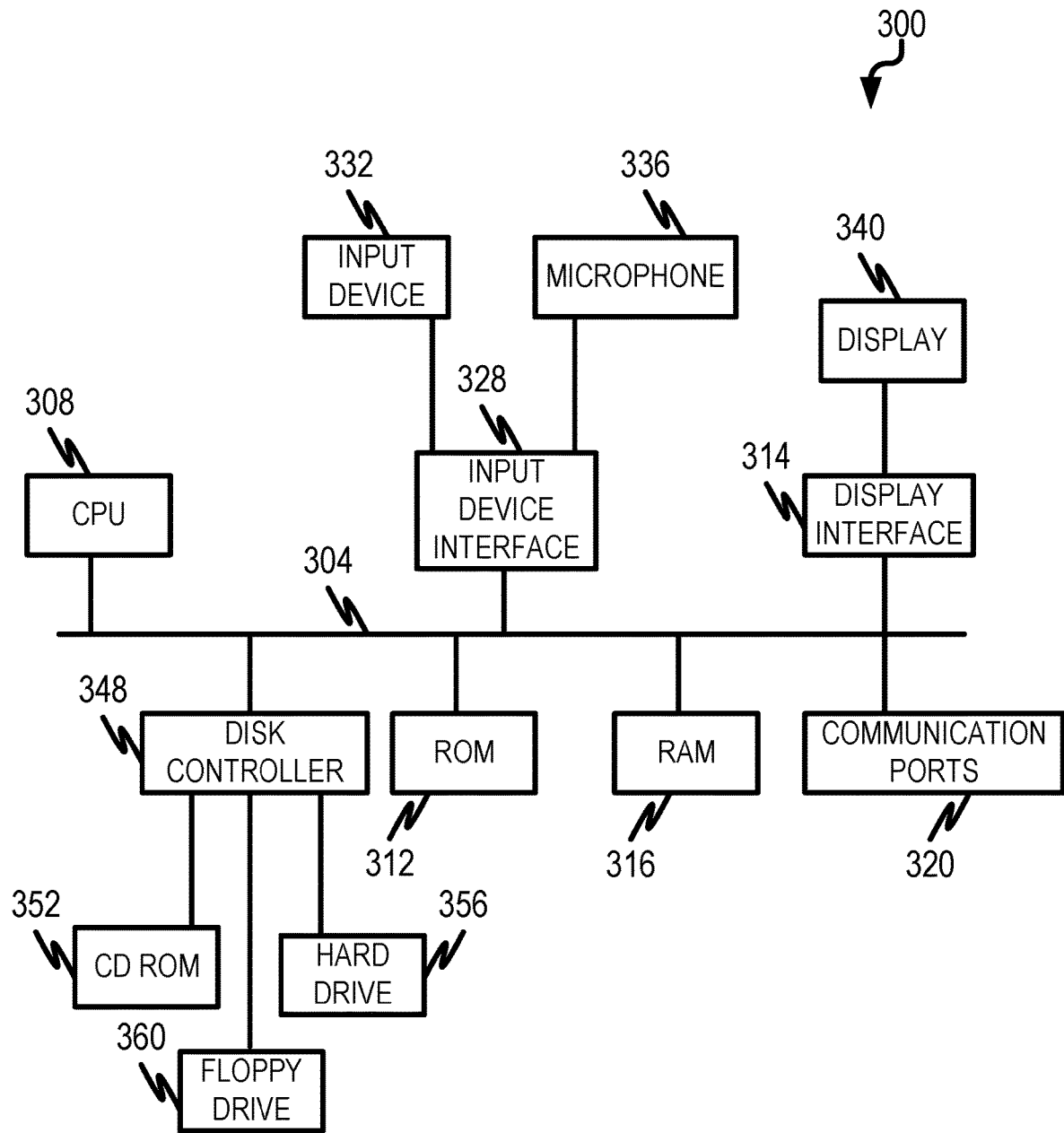
FIG. 3 is a diagram illustrating aspects of a computing device that can be used for implementing subject matter described herein.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for maintaining anonymity between organizations while determining a median performance value, the computer-implemented method comprising:

receiving, by a server from each pair of a plurality of clients, a corresponding garbled circuit encoding a comparison function, wherein the server is remote and different from the plurality of clients;

receiving, by the server from each pair of the plurality of clients, garbled inputs characterizing respective datasets, the garbled inputs comprising:
   a first garbled input received from a first client of the respective pair of clients, the first garbled input characterizing a first dataset from a first organization including one or more performance indicators of the first organization; and
   a second garbled input received from a second client of the respective pair of clients distinct from the first client, the second garbled input characterizing a second dataset from a second organization including one or more performance indicators of the second organization;

evaluating, by the server, the garbled circuits using the garbled inputs to result in a plurality of comparison bits;

sorting, by the server, the first dataset and the second dataset in an ascending or descending order by using the comparison bits to compute a rank of each dataset;

determining, by the server using the sorted first dataset from the first organization and the sorted second dataset from the second organization, a median performance value for the datasets; and transmitting, by the server, data characterizing the median performance value to each of the clients such that anonymity is maintained among the organizations.

2. The method of claim 1 further comprising:
sharing, among each pair of a plurality of clients, a common seed prior to transmitting their respective garbled circuits.

3. The method of claim 2, wherein the common seed is shared amongst the clients using a key exchange protocol.

4. The method of claim 3, wherein the common seed is a shared symmetric key used to seed a pseudorandom number generator that is used to generate the respective garbled circuits and garbled inputs.

5. The method of claim 4, wherein the key exchange protocol is a Diffie-Hellmann key exchange protocol.

6. The method of claim 1, wherein if a size of the datasets is odd, the median performance value is a middle performance value in the sorted datasets.

7. The method of claim 1, wherein if a size of the datasets is even, the median performance value is a mean of two middle values in the sorted datasets.

8. The method of claim 1 further comprising:
receiving, by the server, a respective public key from each client; and
transmitting, by the server, the public keys to each client.

9. The method of claim 8 further comprising:
selecting, by the server, an encrypted data characterizing the median performance value using the respective public keys of each of the clients; and
wherein the data transmitted to each of the clients is encrypted for each such respective client.

10. A system for maintaining anonymity between organizations while determining a median performance value, the system comprising:
at least one data processor; and
memory storing instructions which, when executed by the at least one data processor, result in operations comprising:
   receiving, by a server from each pair of a plurality of clients, a corresponding garbled circuit encoding a comparison function,
   wherein the server is remote and different from the plurality of clients;
   receiving, by the server from each pair of the plurality of clients, garbled inputs characterizing respective datasets, the garbled inputs comprising:
      a first garbled input received from a first client of the respective pair of clients, the first garbled input characterizing a first dataset from a first organization including one or more performance indicators of the first organization; and
      a second garbled input received from a second client of the respective pair of clients distinct from the first client, the second garbled input characterizing a second dataset from a second organization including one or more performance indicators of the second organization;
   evaluating, by the server, the garbled circuits using the garbled inputs to result in a plurality of comparison bits;
   sorting, by the server, the first dataset and the second dataset in an ascending or descending order by using the comparison bits to compute a rank of each dataset;
   determining, by the server using the sorted first data set from the first organization and the sorted second dataset from the second organization, a median performance value for the datasets; and
   transmitting, by the server, data characterizing the median performance value to each of the clients such that anonymity is maintained among the organizations.

11. The system of claim 10, wherein the operations further comprise:
sharing, among each pair of a plurality of clients, a common seed prior to transmitting their respective garbled circuits.

12. The system of claim 11, wherein the common seed is shared amongst the clients using a key exchange protocol.

13. The system of claim 12, wherein the common seed is a shared symmetric key used to seed a pseudorandom number generator that is used to generate the respective garbled circuits and garbled inputs.

14. The system of claim 13, wherein the key exchange protocol is a Diffie-Hellmann key exchange protocol.

15. The system of claim 10, wherein if a size of the datasets is odd, the median performance value is a middle value in the sorted datasets.

16. The system of claim 10, wherein if a size of the datasets is even, the median performance value is a mean of two middle values in the sorted datasets.

17. The system of claim 10, wherein the operations further comprise:
receiving, by the server, a respective public key from each client; and
transmitting, by the server, the public keys to each client.

18. The system of claim 17, wherein the operations further comprise:
selecting, by the server, an encrypted data characterizing the median performance value using the respective public keys of each of the clients; and
wherein the data transmitted to each of the clients is encrypted for each such respective client.

19. A non-transitory computer program product storing instructions which, when executed by at least one data processor, result in operations for maintaining anonymity between organizations while determining a median performance value, the operations comprising:
- receiving, by a server from each pair of a plurality of clients, a corresponding garbled circuit encoding a comparison function,
- wherein the server is remote and different from the plurality of clients;
- receiving, by the server from each pair of the plurality of clients, garbled inputs characterizing respective datasets, the garbled inputs comprising:
  - a first garbled input received from a first client of the respective pair of clients, the first garbled input characterizing a first dataset from a first organization including one or more performance indicators of the first organization; and
  - a second garbled input received from a second client of the respective pair of clients distinct from the first client, the second garbled input characterizing a second dataset from a second organization including one or more performance indicators of the second organization;
- evaluating, by the server, the garbled circuits using garbled inputs to result in a plurality of comparison bits;
- sorting, by the server, the first dataset and the second dataset in an ascending or descending order by using the comparison bits to compute a rank of each dataset;
- determining, by the server using the sorted first dataset from the first organization and the sorted second dataset from the second organization, a median performance value for the datasets; and
- transmitting, by the server, data characterizing the median performance value to each of the clients such that anonymity is maintained among the organizations.

20. The computer program product of claim 19, wherein the operations further comprise:
- sharing, among each pair of a plurality of clients, a common seed prior to transmitting their respective garbled circuits;
- wherein the common seed is a shared symmetric key used to seed a pseudorandom number generator that is used to generate the respective garbled inputs.

* * * * *